2,762,234

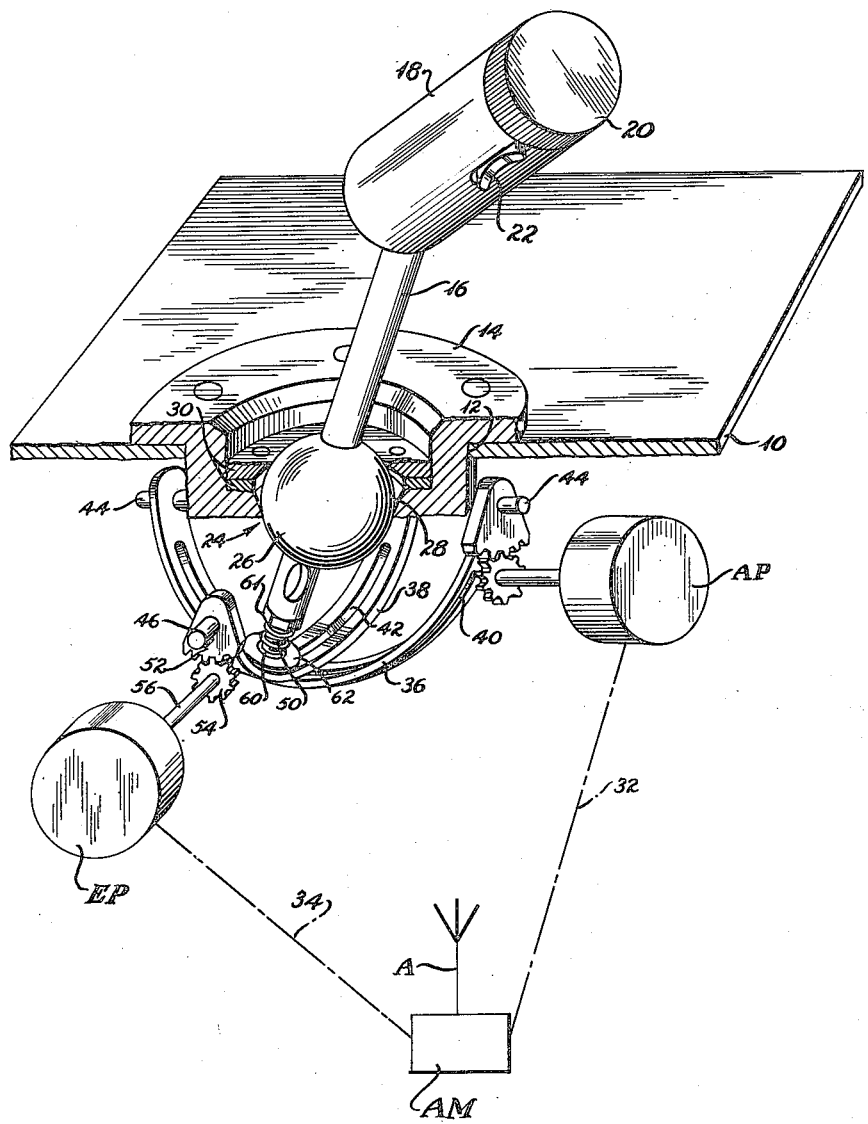

SEARCH-TRACK RADAR CONTROL

Roy Frank Dodd, Catonsville, Md., assignor, by mesne assignments, to the United States of America as represented by the Secretary of the Navy Application September 8, 1952, Serial No. 308,402

2 Claims. (Cl. 74—471)

This invention relates to improvements in radar control equipment, particularly that used in military aircraft.

The problem of simultaneously flying and fighting in modern single seat military aircraft has necessitated the simplification of search track radar controls to one hand operation, with as much instinctive coordination of the pilot's actions retained as possible. Past solutions of this problem have resulted in controls that are relatively complex internally, from a mechanical standpoint, heavy and bulky. Accordingly, it is an object of this invention to provide a radar control assembly that is mechanically simple in construction, the use of which permits the pilot to sweep the radar range for possible targets, move his antenna to the chosen target, and lock in on the target selected (all as viewed on the radar indicator). The hand of the pilot does not have to change grip on the control column to perform these operations, thus leaving the other hand free to control the aircraft.

A further object of the invention is to provide a manual control assembly including a control shaft or column mounted for swivel movement, the lower end of which is operatively connected by a drag adjustment unit to a pair of pivoted tracks so that motion of the control shaft is converted to compounded motion of the tracks, one component of which being derived from one track to operate a potentiometer and another component of which being derived from the other track to actuate another potentiometer, the potentiometers being connected with conventional means of adjusting the radar antenna to control the actuation thereof in accordance with the electrical signal information supplied by the potentiometers.

Other objects and features of importance will become apparent in following the description of the illustrated form of the invention.

In the drawing, the figure is a partially perspective and schematic view of the radar control assembly connected with a standard airborne radar antenna and antenna motor.

As disclosed in the drawing, the omission of all wires, cables or the like has been achieved in this invention. Moreover, due to the similarity of the radar antenna control assembly to an aircraft control stick, it is easier for a pilot to use due to his past flying experience and training. A control panel fragment 10 is proivded with an aperture 12 to accommodate the housing 14 which is suitably fixed to panel 10. A control column or shaft 16 is passed through a central opening in the housing and is provided with a suitable grip 18 at its upper end. The grip may be of any desired configuration, even though it is illustrated as being cylindrical. The grip contains various conventional apparatus such as the range stroboscope adjusting means actuated by knob 20 and locking mechanism operated by trigger 22.

Means 24 mounting the shaft 16 at a location intermediate its ends, in the central aperture of the housing are provided, and are preferably a ball 26 and socket 28, the latter being formed in part by the central aperture of the housing 14 and in part by the contoured surfaces of the retainer rings 30 disposed in and secured to the housing. The ball 26 is fixed to the shaft 16 and is located in socket 28, whereby the shaft 16 is capable of swivel motion in the panel 10.

Certain conventional elements are shown schematically, such as the airborne radar antenna A, its motor AM electrical connections 32 and 34, azimuth potentiometer AP and elevation potentiometer EP which are connected to the antenna motor AM by connections 32 and 34.

Means for actuating the potentiometers are operatively connected with the lower end of the control shaft 16 and potentiometers AP and EP. The means consists of tracks 36 and 38 respectively, each being arcuate and provided with a longitudinally extending slot. Slot 42 in track 38 overlies slot 40 in track 36, and each track is mounted for pivotal motion. Aligned trunnions 44 are at the ends of track 36, the central axes of which coincide with the pivot axis of track 36; and there are trunnions 46 at the ends of track 38 whose axes are coplanar with and normal to the pivot axis of track 36. A shank 50 at the lower end of control shaft 16 is engaged with both of the slots 40 and 42 respectively. Hence, when the shaft 16 is pilot actuated, the motion of its lower end is converted to a compound movement including two components, one component moving track 38 about its axis of rotation and the other component moving track 36 about its axis of rotation.

Motion is derived from track 38 to actuate the elevation potentiometer EP, and motion is derived from the track 36 to actuate azimuth potentiometer AP. The transmissions for the potentiometers are identical, each comprising a gear segment 52 that is fixed to one of the tracks, and a pinion 54 fixed to its potentiometer adjusting shaft 56.

In operation, the pilot moves the control shaft 16 which moves the tracks 36 and 38 about their respective axes. At the same time the gearing connected with the tracks cause the potentiometers to be adjusted an amount proportional to the amount of displacement of their tracks. Accordingly, the outputs of the potentiometers are varied as a function of the amount and direction of pilot actuation of the control shaft 16. Inasmuch as the potentiometers are arranged to supply information to the antenna motor AM, pilot actuation of the shaft 16 controls the elevation and azimuth of the antenna A.

Although the shank 50 fitted in slots 40 and 42 will cause movement of tracks 36 and 38 in response to motion of the control shaft, in order to provide for increasing or decreasing drag at this point, the sliding connection between the tracks and the shaft 16 has a drag adjustment. It consists of a spring 60 or an equivalent, that reacts on a nut 61 adjustably carried by the shaft 16 or its shank 50, and a bearing 62 loosely fitted on shank 50 and contacting the track 38. Manipulation of nut 61 increases or decreases the compression force applied by the spring 60 on the bearing 62, this governing the amount of frictional resistance to sliding motion between the column 16 and track 38.

Even though only a single embodiment of the invention is illustrated, various modifications as fall within the scope of the following claims may be made without departing from the protection afforded thereby.

What is claimed is:

1. A search-track radar control apparatus mounted in a panel and comprising, a control shaft, a ball fixed to said shaft intermediate the ends thereof, socket means in said panel for receiving said ball whereby the shaft may be moved swivelly, a first pair of trunnions extending exteriorly of said socket means, a second pair of trunnions extending exteriorly of said socket means and perpendicular to said first pair of trunnions, the axes of said first and second trunnions intersecting the axis of said ball and socket, a first slotted arcuate track pivoted on said first trunnions, a second slotted arcuate track pivoted on said second trunnions and superposed relative to said first track, said shaft extending through the slots of said first and second tracks, spring actuated friction means on said shaft and engaging one of said tracks, first gear means fixed to said first track and rotatable about the trunnion axis thereof, second gear means fixed to said second track and rotatable about the trunnion axis thereof, a first pinion meshing with said first gear means and driven thereby, a second pinion meshing with said second gear means and driven thereby, a first potentiometer driven by said first pinion, and a second potentiometer driven by said second pinion.

2. A search-track radar control apparatus mounted in a panel and comprising, a control shaft, a ball formed around said shaft intermediate the ends thereof, socket means in said panel for receiving said ball whereby the shaft may be moved swivelly, a first slotted semicircular track pivoted at the ends thereof externally of said socket means, a second slotted semicircular track pivoted at the ends thereof externally of said socket means and at right angles to said first track, the pivotal axes of said first and second tracks intersecting at the center of said ball, a reduced extension of said shaft extending through the slots of said first and second tracks whereby motion is imparted to said tracks in accordance with the angular motion of said shaft, spring tension means for maintaining said shaft and tracks in selected angular position, a first potentiometer, a second potentiometer, first gear drive means interposed between said first track and said first potentiometer, second gear drive means interposed between said second track and said second potentiometer, said first and second gear means rotating said first and second potentiometers at a greater ratio than the rotation at the axes of said first and second tracks.

References Cited in the file of this patent

UNITED STATES PATENTS

| | | |
|---|---|---|
| 1,065,216 | Christiansen | June 17, 1913 |
| 1,177,656 | Sharp | Apr. 4, 1916 |
| 1,612,806 | Gehersky | Jan. 4, 1927 |
| 1,641,567 | Barling | Sept. 6, 1927 |
| 1,932,469 | Leib et al. | Oct. 31, 1933 |
| 2,136,697 | Lapsley | Nov. 15, 1938 |
| 2,379,778 | Allen | July 3, 1945 |
| 2,645,150 | Robbins | July 14, 1953 |

FOREIGN PATENTS

| | | |
|---|---|---|
| 354,697 | Great Britain | Feb. 7, 1930 |